Nov. 11, 1924.  
A. E. WOLTER  
1,515,005  
SPOTLIGHT  
Filed Sept. 20, 1922

INVENTOR  
Antone E. Wolter  
BY  
Pierre Barnes  
ATTORNEY

Registered Nov. 11, 1924.

1,515,005

UNITED STATES PATENT OFFICE.

ANTONE E. WOLTER, OF EVERETT, WASHINGTON.

SPOTLIGHT.

Application filed September 20, 1922. Serial No. 589,408.

*To all whom it may concern:*

Be it known that I, ANTONE E. WOLTER, a citizen of the United States, residing at Everett, in the county of Snohomish and State of Washington, have invented certain new and useful Improvements in Spotlights, of which the following is a specification.

This invention relates to spot-lights for motor vehicles, its object being the perfecting of devices of this character, to render the same more useful, convenient to control and peculiarly efficient in operation.

The invention consists in the novel construction, adaptation and combination of parts hereinafter described and claimed.

In the accompanying drawings,—

Figure 1:
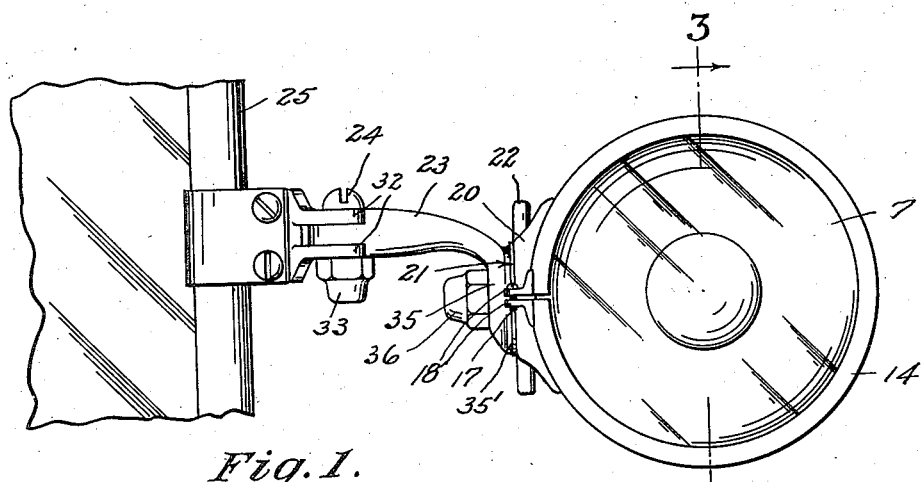
Figure 2:
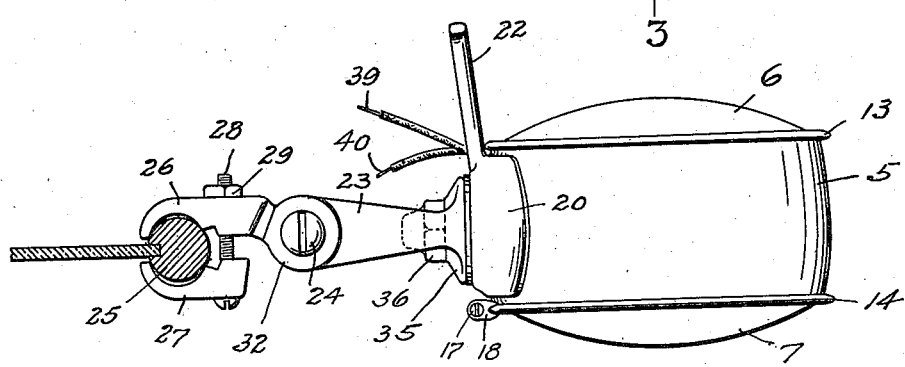
Figure 3:
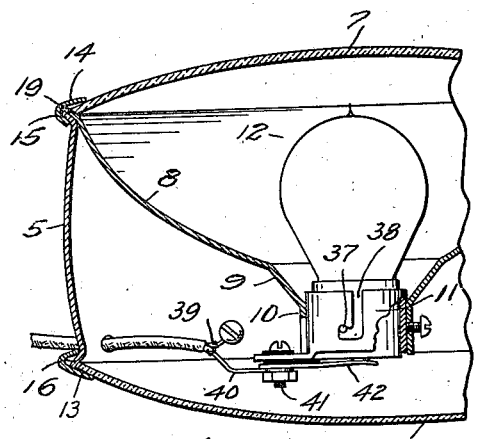
Figure 4:
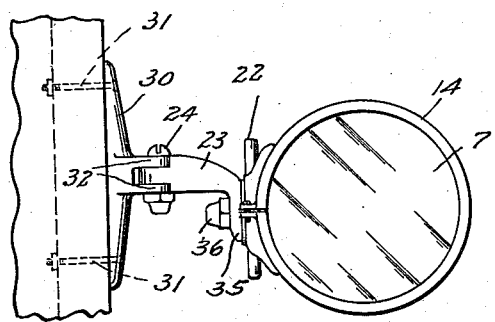

Figure 1 is a front elevational view of a spot-light embodying my invention, shown applied to an automobile windshield. Fig. 2 is a plan view with the windshield shown in horizontal section. Fig. 3 is a fragmentary sectional view through 3—3 of Fig. 1. Fig. 4 is a front elevation of the spot-light applied as to the front end of a closed car.

The housing of the spotlight, which same encloses the lamp and reflector elements which will be hereinafter referred to, comprises a substantially cylindrical shell or body 5, a mirror 6 and a lens 7. Both the mirror and lens are of the concavo-convex type, and the mirror is designed to reflect the image of objects located at the side or to the rear of the vehicle.

Within the shell is provided a reflector having a substantially parabolic front portion 8, a central conical portion 9, and a tubular rear portion 10 which latter serves as the socket 11 for the stem of a lamp bulb 12.

As illustrated the mirror 6 and lens 7 are connected to the shell 5 by band members 13 and 14, said bands being provided with internal grooves to receive the end flanges 15 and 16 of the shell and the peripheries of the mirror and lens. Screw bolts, such as 17, Fig. 1, engaging lug attachments 18 of the respective bands serve to detachably clamp the bands to the shell. The band 14 also serves to secure said reflector in place by the provision on the reflector of a peripheral flange 19 which is interposed between the lens 7 and the adjacent shell flange 15.

Rigidly secured to the shell, as by welding or rivets, is a block 20 having at its outer side a vertically disposed plane surface 21.

22 represents a controlling handle extending rearwardly from the block 20. 23 represents an arm which is pivotally connected at one end by means of a vertically disposed headed bolt 24 to a car attachment.

Where the spot-light is to be applied to the frame, as 25, of a windshield, said attachment comprises two members 26 and 27 which are coupled to said frame by means of a clamping screw 28 and a nut 29.

With a closed car, such as a sedan for example, said attachment is in the nature of a wall plate or bar 30 (Fig. 4) which is rigidly secured to the car as by means of bolts 31 or an equivalent.

The attachment, or one member of the attachment—as the member 26 in Figs. 1 and 2—is provided with horizontally protruding spaced bars 32 between which is fitted an end of the arm 23 and through which the bolt 24 extends.

33 represents a nut engaging the screw threaded end of the bolt 24 for regulating frictional engagement between the attachment ears 32 and the arm 23. The outer end of said arm is turned downwardly, as at 35, and provided with a plane extremity, which is juxtaposed with a washer $35^1$ which fits against the plane surface 21 of the casing block 20.

A horizontal screws bolt, indicated by 36, is employed to regulate the frictional engagement between the arm 23 and the casing block 20.

The stem of the lamp 12 is provided with a stud 37 which engages within an L-shaped or bayonet slot 38 provided in the socket 11 to form a readily separable connection.

The circuit connections with the lamp is desirably effected through the medium of leads 39 and 40, the former being grounded through the metallic shell and socket, and the other lead 40 through a binding post 41 and a contact 42.

The spot-light is readily controlled by the operator through the instrumentality of the handle 22, movement in horizontal and vertical planes being respectively effected about the axes of the bolts 24 and 36.

What I claim, is,—

In a spotlight comprising a detachable lens and a detachable mirror, a body arranged between said lens and said mirror and formed with flared edge portions bent to support the lens and mirror, said flared edge portions being inclined to present in angular bearing surface toward the peripheral edges of the lens and mirror, a lamp carrying member disposed with a portion thereof interposed between the peripheral edge of the lens and the adjacent flared edge portion of the body, means engaging the edge portions of the body and the lens and mirror for maintaining the assembly, a block member carried by the body and formed with a plane bearing surface, and a handle integrally formed on the block member and extending laterally therefrom to facilitate manipulation of the spotlight.

Signed at Seattle, Washington, this 30th day of August, 1922.

ANTONE E. WOLTER.

Witnesses:
PIERRE BARNES,
MARGARET G. SUPPLE.